United States Patent
Bracken et al.

(10) Patent No.: US 10,455,191 B2
(45) Date of Patent: *Oct. 22, 2019

(54) SYSTEMS AND METHODS FOR CONFERENCE CALLING USING PERSONAL URL

(71) Applicant: LogMeIn, Inc., Boston, MA (US)

(72) Inventors: John Lawrence Bracken, Reston, VA (US); Daniel Boice, Sterling, VA (US)

(73) Assignee: LogMeIn, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,487

(22) Filed: Jul. 20, 2016

(65) Prior Publication Data

US 2017/0104959 A1 Apr. 13, 2017

Related U.S. Application Data

(63) Continuation of application No. 14/473,011, filed on Aug. 29, 2014, now abandoned, which is a continuation of application No. 13/826,210, filed on Mar. 14, 2013, now Pat. No. 8,855,285.

(51) Int. Cl.

| H04N 7/14 | (2006.01) |
|---|---|
| H04L 29/06 | (2006.01) |
| H04M 7/00 | (2006.01) |
| H04M 3/42 | (2006.01) |
| H04M 3/56 | (2006.01) |
| H04L 29/08 | (2006.01) |
| H04N 7/15 | (2006.01) |

(52) U.S. Cl.
CPC ......... *H04N 7/147* (2013.01); *H04L 65/1006* (2013.01); *H04L 65/403* (2013.01); *H04L 67/146* (2013.01); *H04L 67/24* (2013.01); *H04M 3/42119* (2013.01); *H04M 3/565* (2013.01); *H04M 7/003* (2013.01); *H04M 7/006* (2013.01); *H04M 7/0012* (2013.01); *H04N 7/15* (2013.01); *H04M 2203/5063* (2013.01)

(58) Field of Classification Search
CPC ............................. H04M 7/006; H04L 65/403
USPC ............................... 379/202.01, 158, 201.01
See application file for complete search history.

(56) References Cited

U.S. PATENT DOCUMENTS

| 5,991,394 A | 11/1999 | Dezonno et al. |
|---|---|---|
| 6,304,648 B1 | 10/2001 | Chang |
| 6,311,231 B1 | 10/2001 | Bateman et al. |
| 6,463,149 B1 | 10/2002 | Jolissaint et al. |
| 6,668,286 B2 | 12/2003 | Bateman et al. |

(Continued)

*Primary Examiner* — William J Deane, Jr.
(74) *Attorney, Agent, or Firm* — David H. Judson (57) ABSTRACT

Systems and methods are disclosed for managing conference calling using a URL assigned to a conference call organizer. One method includes receiving, from a conference call organizer, a request to be placed into a conference call associated with a URL assigned to the organizer; and receiving, from a prospective conference call participant, a request to be placed into the conference call associated with the URL. Another method includes receiving, from a first user, through a web page of a URL assigned to the first user, a first phone number at which the first user can be called; receiving, from a second user, through the web page of the URL, a second phone number at which the second user can be called; and initiating phone calls to the first user at the first number and the second user at the second number.

18 Claims, 8 Drawing Sheets

(56) References Cited

U.S. PATENT DOCUMENTS

| | | | |
|---|---|---|---|
| 6,934,747 B1* | 8/2005 | McGrath | G06F 11/3409 |
| | | | 345/418 |
| 7,159,043 B2 | 1/2007 | Bateman et al. | |
| 7,640,303 B2 | 12/2009 | Blumofe | |
| 8,539,028 B2 | 9/2013 | Anka | |
| 2003/0158900 A1* | 8/2003 | Santos | H04M 3/567 |
| | | | 709/205 |
| 2006/0088152 A1* | 4/2006 | Green | H04M 3/56 |
| | | | 379/202.01 |
| 2010/0061538 A1* | 3/2010 | Coleman | H04L 12/1818 |
| | | | 379/202.01 |
| 2010/0111277 A1* | 5/2010 | Griesmer | H04M 3/42 |
| | | | 379/201.03 |

* cited by examiner

WELCOME TO YOUR CALL
ENTER YOUR PHONE NUMBER AND WE'LL CALL YOU.

510 — (571) 272-1000    CALL ME NOW ⌒512

PEOPLE ON THE CALL: 0 HAVE AN EXTENSION? | JOIN THROUGH YOUR COMPUTER | OTHER WAYS TO JOIN A CALL

JOIN YOUR CALL.
PICK UP, WE'RE CALLING YOU NOW...    522

CALLING: (571) 272 - 1000    ☎ CANCEL CALL

PEOPLE ON THE CALL: 0 HAVE AN EXTENSION? | JOIN THROUGH YOUR COMPUTER | OTHER WAYS TO JOIN A CALL

SYSTEMS AND METHODS FOR CONFERENCE CALLING USING PERSONAL URL

TECHNICAL FIELD

Various embodiments of the present disclosure relate generally to conference calling over telephones, mobile devices, and/or computers, using PSTN, online, and/or VoIP technologies. More specifically, exemplary embodiments of the present disclosure relate to systems and methods for initiating conference calling using a personal URL provided to call participants.

BACKGROUND

Conference calls today are typically initiated and joined using a complex series of steps. First, a person who wishes to organize a conference call must register a new account with a company that provides conference calling services. The organizer typically must provide the company with information such as a full name, address, phone number, e-mail address, a username, and a password. In some cases, the conference calling company may charge a monthly fee or per-minute fees for the ability to initiate conference calls, in which case the organizer might also provide the company with a credit card number, expiration date, security code, and billing address.

If the organizer is successful in opening a new account, the conference calling service typically provides the organizer with at least three long numbers: a dial-in number, a conference room number, and a moderator number. The organizer is instructed to provide prospective call participants with the dial-in number and conference room number for them to enter at a call time, but to keep the moderator number secret, for use in initiating the call at the call time. In some cases, the conference calling company provides even more numbers to the organizer. For example, the company might provide the organizer with both toll-free (e.g., 1-800 or 1-877) numbers and local ten-digit numbers that the organizer and participants can use as dial-in numbers, along with information about the different fees associated with dialing-in through the toll-free number(s) vs. the local ten-digit numbers. The local ten-digit numbers might be provided in a long list of local numbers corresponding to major metropolitan areas, which users can dial based on their current location to avoid fees associated with long-distance calls or fees charged by the conference calling company to use the toll-free dial-in number.

Thus, the organizer is often confronted with a web-page or e-mail containing as many as 20-30 different phone numbers and dial-in numbers, codes, and/or pins, at least two of which, and possibly more, the organizer must provide to prospective conference call participants. However, the organizer must be careful to avoid sharing the moderator number (sometimes referred to as the moderator pin) in place of the conference room number. In some cases, the conference room number (sometimes referred to as an access code or pin) may be a phone number familiar to the organizer, such as the organizer's phone number, or the moderator pin might be a ten-digit number that resembles a telephone number, adding to confusion associated with initiating and managing conference calls.

Even if an organizer successfully provides participants with the right combination of numbers (the correct dial-in number(s) and conference room code), and also retains the moderator number or pin for entering to initiate the call, additional problems may occur. First, any one of the prospective call participants may mis-dial the toll-free or local ten-digit dial-in number, and/or they might mis-dial the conference room code. In addition, the call organizer might mis-dial one or more of the toll-free or ten-digit dial-in number, the conference room code, and the moderator code. With these existing technologies, a conference call will only be successfully initiated if each and every one of the call participants and organizer correctly enter the more than nineteen digits assigned to them.

Moreover, because the dial-in numbers, conference room numbers, and moderator pins are not memorable, call participants are required to keep all of these numbers readily on hand when they are preparing to dial-in to a conference call. Anyone familiar with these dial-in techniques has experienced the frustrating process of looking back and forth between an e-mail, calendar invite, or paper, which contains the dial-in numbers, and a phone where those numbers must be entered. The process is susceptible to entering the wrong dial-in number or conference room code. Likely thousands of people each year experience the frustration of waiting on a conference call for another participant or organizer, only to find out that they or their other participants entered the wrong conference room code. Moreover, because these conference call numbers are not memorable, dialing-in while away from a computer, such as from a mobile device, is even more challenging. Participants have to write down the dial-in information before the call, or switch back and forth between a phone interface and e-mail or calendar interface to obtain the required access numbers. In short, existing techniques for initiating and joining conference calls are replete with inefficiencies and disadvantages, costing users significant frustration and wasted time and productivity.

Accordingly, a need exists for systems and methods for initiating conference calling using more modern telephonic and Internet technologies. More specifically, a need exists for systems and methods for initiating conference calling using a personal URL provided to call participants.

SUMMARY OF THE DISCLOSURE

According to certain embodiments, methods are disclosed for managing conference calling using a URL assigned to a conference call organizer. One method includes receiving, from a conference call organizer, a request to be placed into a conference call associated with a URL assigned to the organizer; and receiving, from a prospective conference call participant, a request to be placed into the conference call associated with the URL.

According to certain embodiments, systems are disclosed for managing conference calling using a URL assigned to a conference call organizer. One system includes a data storage device storing instructions for managing conference calling using a URL assigned to a conference call organizer; and a processor configured to execute the instructions to perform a method including: receiving, from a conference call organizer, a request to be placed into a conference call associated with a URL assigned to the organizer; and receiving, from a prospective conference call participant, a request to be placed into the conference call associated with the URL.

According to certain embodiments, methods are disclosed for managing conference calling using a URL assigned to a conference call user. One method includes receiving, from a first user, through a web page of a URL assigned to the first user, a first phone number at which the first user can be called; receiving, from a second user, through the web page of the URL, a second phone number at which the second user can be called; and initiating phone calls to the first user at the first number and the second user at the second number.

According to certain embodiments, systems are disclosed for managing conference calling using a URL assigned to a conference call user. One system includes a data storage device storing instructions for managing conference calling using a URL assigned to a conference call user; and a processor configured to execute the instructions to perform a method including: receiving, from a first user, through a web page of a URL assigned to the first user, a first phone number at which the first user can be called; receiving, from a second user, through the web page of the URL, a second phone number at which the second user can be called; and initiating phone calls to the first user at the first number and the second user at the second number.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes, among other things, systems and methods for enabling individuals to initiate a voice conference call using a personal URL that identifies a user's personal, dedicated conference bridge line. According to certain embodiments, the URL can be distributed by the originator of the conference call to the other participants by email, instant message, text message, or other means, creating a link that can be clicked on to join the conference call.

Participants who receive the organizer's URL and visit the web page associated with the organizer's URL may be prompted to enter a phone number where they can be reached, or to join via a Voice over Internet Protocol ("VoIP") connection to a conference bridging service that bridges all participants into a single conference call. Specifically, if the participant wishes to join the conference call using conventional voice telephony from a landline or mobile phone, the participant can enter his/her phone number, and a conference calling system may call the participant back at that number, joining the participant to the conference call using the voice telephony. Alternatively, the user can join the call using Voice over Internet Protocol ("VoIP") connection to a conference bridging service that bridges all participants into a single conference call.

In one embodiment, all participants may join the conference call and be bridged into a shared web page where call participants can visually see who is on the line, who is talking, and the names and/or phone numbers of all call participants. Moreover, participants may join the conference call from a mobile device, or from a desktop, using VoIP or by means of a conventional telephony link using a conferee's phone number. The presently-disclosed systems and methods may be implemented using a combination of web applications and mobile apps (such as iOS and Android), and the personal URLs can be emailed or transmitted through e-mail, SMS, or other means to potential conferees.

Figure 1:
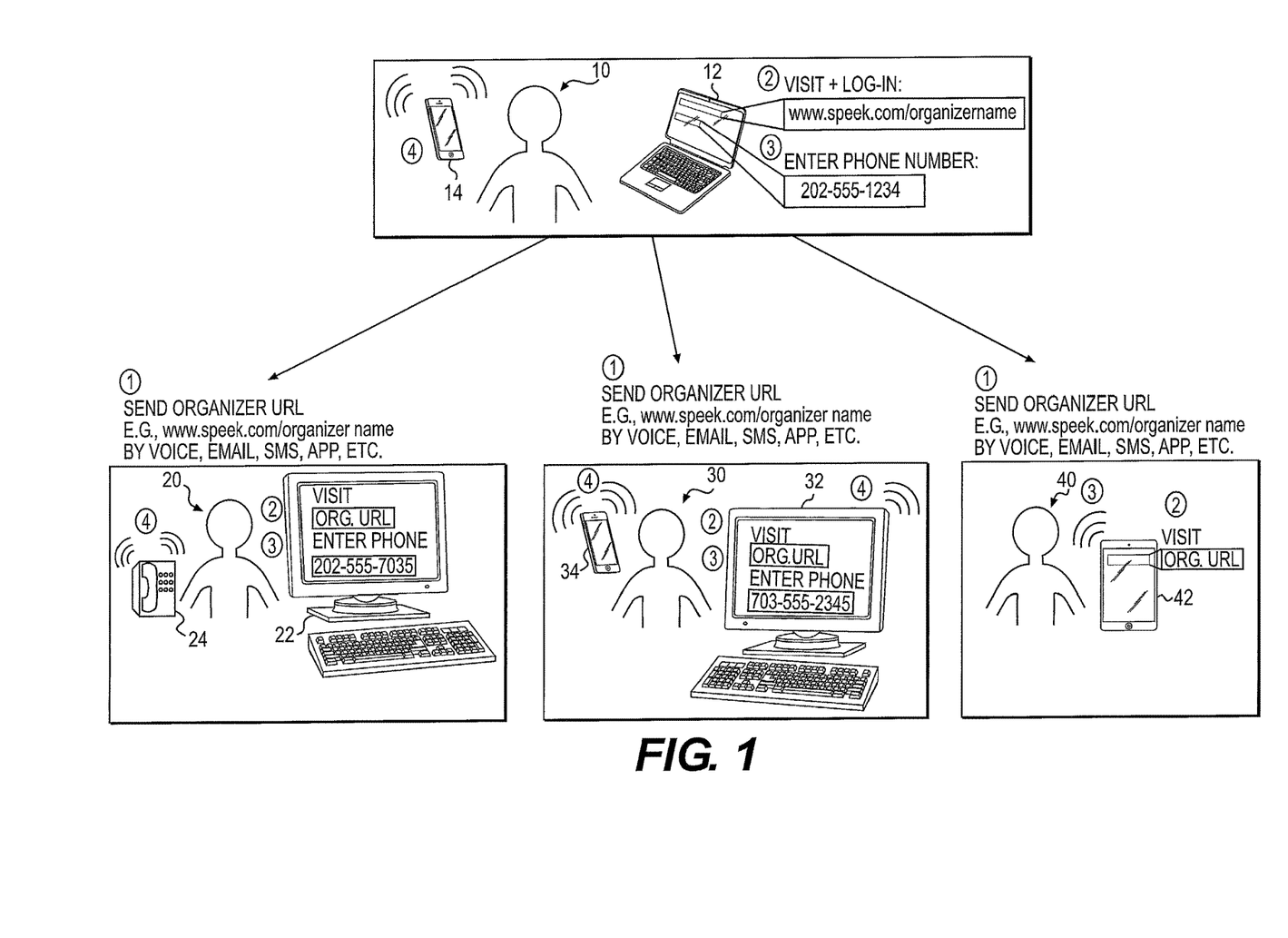
FIG. 1 is a conceptual diagram of a method by which conference calling may be initiated from a personal URL, according to exemplary embodiments of the present disclosure.

Turning now to the figures, FIG. 1 is a conceptual diagram of a method by which conference calling may be initiated from a personal URL, according to exemplary embodiments of the present disclosure. FIG. 1 depicts an organizer 10 and a plurality of participants 20, 30, 40. FIG. 1 depicts an overview of a process by which organizer 10 may initiate a conference call with participants 20, 30, 40, using a personalized URL, as opposed to a traditional dial-in number and access code or pin. Specifically, organizer 10 may have obtained a personalized, static URL from a conference calling service consistent with the presently disclosed systems and methods. For example, organizer 10 may have received a URL illustrated in this case as, "www.speek.com/organizername." It should be appreciated that the domain of the URL (shown here as "speek.com") may be any domain associated with the conference calling system practicing the presently disclosed embodiments. The path of the URL (shown here as "organizername") may be any word, phrase, name, or number selected by the organizer.

According to an aspect of the present disclosure, the organizer 10 may enable a conference call by sharing the organizer's personal URL with the participants by any desired means (Step 1). For example, the organizer 10 may share the URL with the participants 20, 30, 40 by voice, telephone, short message service (SMS), instant message (IM), e-mail, mobile application, or any other possible means for sharing a URL. The organizer 10 may share the personal URL with the participants at any time before a planned conference call. In one embodiment, the organizer 10 may share the personal URL with the participants 20, 30, 40 as soon as the organizer 10 obtains the personal URL, and well before any call is scheduled. Thus, participants 20, 30, 40 may have the personal URL on file and accessible anytime a conference call is planned, even though organizer 10 may also send participants 20, 30, 40 the URL at the time of scheduling a call.

Still referring to FIG. 1, the organizer 10 and participants 20, 30, 40 may schedule a call at any time and by any means, such as by e-mail, phone, calendar invitation, voice, etc. Then, at or around the proposed call time, the organizer 10 and participants 20, 30, 40 may visit the organizer's personal URL (Step 2). For example, as illustrated in FIG. 1, organizer 10 may visit his or her personal URL at a laptop computer 12, participant 20 may visit the organizer's personal URL at a desktop computer 22, participant 30 may visit the organizer's personal URL at desktop computer 32, and participant 40 may visit the organizer's personal URL using mobile device 42. Of course, the depicted use of a desktop computer, laptop computer, or mobile device is only illustrative of the ability to access the organizer's personal URL using any known means, and each of the individuals may use any desired device to visit the organizer's personal URL. In one embodiment, participants 20, 30, 40 may visit the organizer's personal URL by clicking a link to the URL in an e-mail or SMS received from the organizer, or by copying and pasting the received e-mail into a web browser, thereby avoiding the need to type the personal URL and reducing the likelihood of visiting the wrong URL.

In one embodiment, when organizer 10 and participants 20, 30, 40 visit the web page associated with the organizer's URL, each of those individuals may be prompted by the web page to enter a phone number where they can currently be reached. For example, the web page might display a prompt to, "Enter Your Phone Number and We'll Call You." Each of the organizer 10 and participants 20, 30, 40 may then enter a phone number that the conference calling system can call back to reach each of them, respectively (Step 3). For example, FIG. 1 shows each of organizer 10 and participants 20, 30 as entering a phone number where they desire to be called by the conferencing system, including organizer 10 entering the phone number of his or her mobile device 14, participant 20 entering the phone number of his or her landline telephone 24, and participant 30 entering the phone number of his or her mobile device 34.

By contrast, and as an alternative, FIG. 1 shows how participant 40 may have visited the organizer's personal URL with a mobile device having installed thereon a mobile app of the conferencing system. As a result, participant 40 may be connected to the organizer's conference call through the telephone of mobile device 42 without having to enter the phone number of that telephone. In addition, in one embodiment, if organizer 10 is already logged-in to the conferencing system on his or her computer 12, then organizer 10 may see that his or her phone number is pre-entered into the website of the conferencing system. In one embodiment, participant 30 may, instead of entering a callback number, request to be placed into the organizer's conference call through a VoIP connection using his or her computer 32. Again, it should be appreciated that, while FIG. 1 depicts one exemplary combination of an organizer and participants—optionally: (i) entering a phone number of a mobile device 14, (ii) entering a phone number of a landline telephone 24, (iii) joining the call through a VoIP connection of computer 32, and/or (iv) joining the call through a mobile application of mobile device 42—any combination of devices and connections may be used, independent of whether a user is an organizer or a participant.

Once organizer 10 and participants 20, 30, 40 have entered their call-back phone numbers into the web page of the personal URL (and/or requested to be joined through a mobile app for VoIP, or called at a number pre-entered into the system), the conferencing system may call the organizer 10 and participants 20, 30 at the provided number (Step 4) and/or join participants 30, 40 through the VoIP connection or mobile application. For example, as shown in FIG. 1, the mobile device 14 of organizer 10 may ring until organizer 10 answers the call from the conferencing system; the landline telephone 24 of participant 20 may ring until participant 20 answers the call from the conferencing system; the mobile device 34 of participant 30 may ring until participant 30 answers the call from the conferencing system. Alternatively or additionally, the conferencing system may initiate a VoIP call with participant 30 through computer 32 and/or initiate a VoIP call (through the mobile app) or cellular call (through the phone's cellular connection) with participant 40 through mobile device 42.

As each of the organizer 10 and participants 20, 30, 40 establish voice communication with the conferencing system through their selected means, the conferencing system may begin placing those individuals into a common conference call or conference bridge line associated with the organizer's personal URL, as will be described in more detail below. Accordingly, each of the organizer 10 and participants 20, 30, 40 may have very quickly and easily joined a common conference call by simply visiting a web page of the organizer's personal URL, and without dialing a conference call dial-in number or entering a conference room number, access code, or moderator pin.

Figure 2:
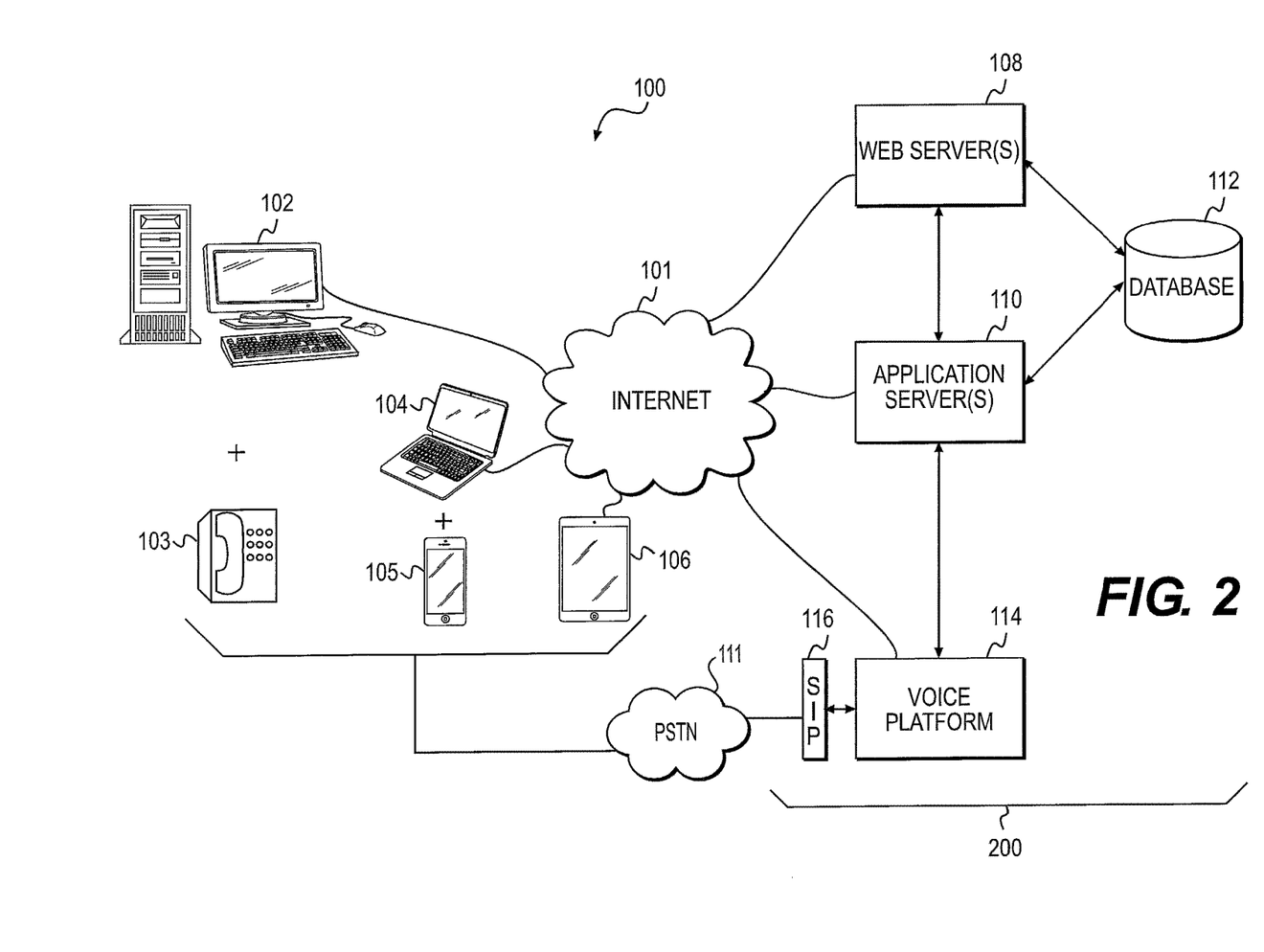
FIG. 2 is a schematic diagram of an environment in which conference calling may be initiated from a personal URL, and systems for initiating conference calling from a personal URL, according to exemplary embodiments of the present disclosure.

FIG. 2 is a schematic diagram of an environment in which conference calling may be initiated from a personal URL, and systems for initiating conference calling from a personal URL, according to exemplary embodiments of the present disclosure. Specifically, FIG. 2 illustrates an exemplary environment 100 including a plurality of user devices 102-106, one or more web servers 108, one or more application servers 110, and a voice platform 114, all disposed in communication with an electronic network, such as the Internet 101. FIG. 2 also depicts one or more database systems 112 in communication with one or both of web server(s) 108 and application server(s) 110, as well as a session initiation protocol ("SIP") trunking interface 116 disposed between voice platform 114 and a public switched telephone network ("PSTN") 111.

In one embodiment, one or more of web server(s) 108, application server(s) 110, database(s) 112, voice platform 114, and/or SIP interface 116 may embody a communications system 200, which may be operated either wholly or partially by a conference calling service. Moreover, one or more of web server(s) 108, application server(s) 110, database(s) 112, voice platform 114, and/or SIP interface 116 may be configured to provide and execute the method described above with respect to FIG. 1, and the methods that will be described in more detail below with respect to FIGS. 3 and 4.

In one embodiment, user devices 102-106 may be owned and used by one or more people, who may be any individuals desiring to participate in conference calling consistent with the presently-disclosed embodiments. User devices 102-106 may include any type of electronic device configured to make telephone calls over PSTN 111 and/or send and receive data, such as VoIP data, websites, and content, over the Internet 101.

For example, each of user devices 102, 104 may be a personal computer, laptop, and/or server disposed in communication with the Internet 101. Each of user devices 103 may be a traditional telephone configured to make and receive calls over PSTN 111. Each of user devices 105, 106 may include a mobile device, smartphone, and/or personal digital assistant ("PDA"), tablet computer, or any other kind of mobile device or touchscreen-enabled device disposed in communication with the Internet 101 and also configured to make and receive calls over PSTN 111. In one embodiment, participation in a conference call according to the present embodiments may involve at least a connection to the Internet 101 and optionally a connection to PSTN 111. Thus, a participant associated with computer 102 may be able to make VoIP phone calls over the Internet 101, but may alternatively receive a call from communications system 200 using telephone 103 via PSTN 111. Likewise, a participant associated with laptop 104 may be able to make VoIP phone calls over the Internet 101, but may alternatively receive a call from communications system 200 using mobile device 105 via PSTN 111. By contrast, a participant associated with user device 106 may participate in conference calls using a VoIP connection through the Internet 101 or over PSTN 111, since device 106 may be connected to both networks.

Each of user devices 102, 104, 105, 106 may have a web browser and/or mobile browser installed for receiving and displaying electronic content received from one or more of web server 108 and application server 110. Each of user devices 105, 106 may have an operating system configured to execute a web or mobile browser, and any type of application, such as a mobile application. Each of user devices 102-106 may be configured to execute JavaScript code to facilitate practicing the methods described with respect to FIGS. 1, 3, and 4.

Web server(s) 108 may be owned and/or operated by a conference calling service, e.g., the entity operating communications system 200. Web server(s) 108 may be configured to communicate information, such as web page data, interfaces, user elements, etc. to any browsers of user devices 102, 104, 105, 106. For example, web server(s) 108 may send web page data for displaying a virtual conferencing user interface, including prompts to enter phone numbers, messaging interfaces, in-call interfaces, etc. as will be described in more detail below with respect to the exemplary screenshots of FIGS. 5-12.

Application server(s) 110 may be owned and/or operated by a conference calling service, e.g., the entity operating communications system 200. Application server(s) 110 may be configured to receive information received from web server(s) 108, store received information in database system 112, and communicate instructions and information to voice platform 114 for executing the methods described above with respect to FIG. 1, and below with respect to FIGS. 3-12. Application server(s) 110 may also be configured to communicate information, such as web page data, interfaces, user elements, etc. to any desktop clients and/or mobile applications of user devices 102, 104, 105, 106. In one embodiment, application server(s) 108 may implement any type or combination of application programming interfaces ("APIs") to communicate data between web server(s) 108, database 112, and/or voice platform 114.

In one embodiment, voice platform 114 may include any type of telecommunications platform configured to execute conference calling between both PSTN and VoIP environments. In one embodiment, voice platform 114 and/or SIP interface 116 may operate a cross-platform telephony platform designed to operate VoIP calling and interconnect phone calls with PSTN 111, among other things. In one embodiment, voice platform 114 may be configured to interact with an API of application server(s) 110 to provide user devices 102-106 with conference calling, XML-RPC control of live calls, interactive voice response (IVR) services, TTS/ASR (text to speech/automatic speech recognition), public switched telephone network (PSTN) interconnectivity (supporting both analogue and digital), and voice over IP protocols including SIP, SCCP, H.323, XMPP, GoogleTalk, t.38, among others. In one embodiment, voice platform 114 and SIP interface 116 may be implemented in an open source platform, such as FreeSWITCH or Asterisk.

Database 112 may be configured to store any events and/or data that interacts with communication system 200 or its components. For example, database 112 may store user profile information, including usernames, passwords, URLs, phone numbers, e-mail addresses, etc. In one embodiment, database 112 may be indexed or otherwise structured to facilitate prompt recall of data for each user. In one embodiment, database 112 may store all events that occur in imitating and conducting conference calls through communications system 200. For example, database 112 may store call times (start, end, length, dialing time, answer time, etc.), phone numbers, documents shared, text messages exchanged, and so on. In one embodiment, database 112 may permanently store and provide access to any files or text shared during any conference call. In one embodiment, database 112 may be a MySQL database or a NoSQL database.

Any of user devices 102-106, web server(s) 108, application server(s) 110, and voice platform 114 may include any type or combination of computing systems, such as handheld devices, personal computers, servers, clustered computing machines, and/or cloud computing systems. In one embodiment, each of user devices 102-106, web server(s) 108, application server(s) 110, and voice platform 114 may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Figure 3:
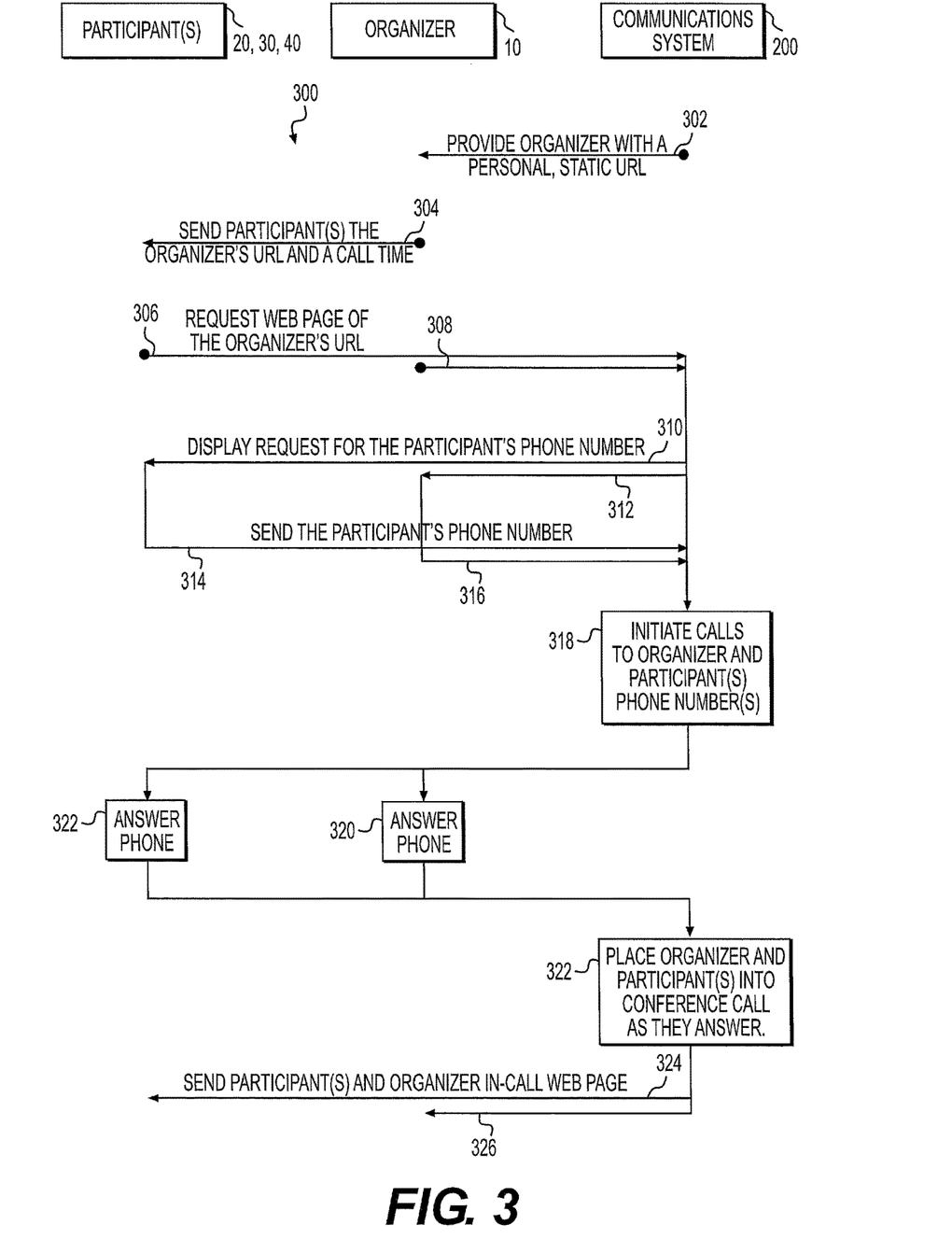
FIG. 3 is a flow diagram of a method for initiating conference calling from a personal URL, according to exemplary embodiments of the present disclosure.

FIG. 3 is a flow diagram of a method for initiating conference calling from a personal URL, according to exemplary embodiments of the present disclosure. Specifically, FIG. 3 depicts a method 300 by which participants 20, 30, 40, organizer 10, and communications system 200 may interact, such as by using any of user devices 102-106, web server(s) 108, application server(s) 110, and voice platform 114, to initiate and manage conference calling using an organizer's personal URL.

In one embodiment, method 300 may begin with a registration process in which an organizer 10 selects a user name (not shown). The username may be a memorable name, address, or number that the organizer 10 wishes to be included in his or her personal URL. Thus, communications system 200 may provide organizer 10 with a personal, static URL (step 302). In one embodiment, the personal URL provided to the organizer may have as its path the username selected by the organizer 10. For example, as described with respect to FIG. 1, if organizer 10 selects the username "organizername," then communications system 200 may assign to the organizer the personal, static URL, "www.speek.com/organizername" (assuming "speek.com" is the domain of the conference calling service).

Method 300 may then include the organizer sending one or more prospective call participants 20, 30, 40 the organizer's personal URL, possibly along with a call time (step 304). As described above, organizer 10 may send the personal URL to the participants at any time after receiving the personal URL from the communications system 200. In one embodiment, organizer 10 may send his or her personal URL to every one of his or her social and/or professional contacts, independent of any call scheduled with them. For example, organizer 10 might publish his or her personal URL on a social network, and/or include it in an e-mail signature. Alternatively, organizer 10 might only send his or her personal URL to prospective call participants, such as in the body of an e-mail proposing a conference call and/or in a calendar invitation, anytime between when a call is scheduled and when the call occurs.

At or around the time of a proposed conference call, participants 20, 30, 40 may request the web page of the organizer's personal URL (step 306). If organizer 10 sent his or her personal URL in an e-mail, SMS, calendar invitation, or some other electronic means, then participants 20, 30, 40 may request the web page of the URL by simply clicking on the URL link in the e-mail, SMS, etc., or by copying and pasting the URL into a browser address bar. Even if organizer 10 provided his or her personal URL by voice or some other means that is not easily accessible, because the organizer 10 may have partially created the URL to include a memorable name or phrase, the participants 20, 30, 40 may more likely be able to easily remember and type the personal URL into a browser address bar.

When each of the participants 20, 30, 40 visits the web page of the organizer's personal URL, the communications system 200 may display a request for the participant's phone number (step 310). For example, one or more of web server(s) 108 may display a web page containing a request for any phone number where the participant can be immediately reached. For example, the web page might include a prompt to, "Enter Your Phone Number and We'll Call You."

Also at or around the time of the proposed conference call, the organizer 10 may also request the web page of the organizer's personal URL (step 308). In other words, the organizer may visit his or her own assigned personal, static URL. Because the organizer may have a static URL assigned as his or her personal URL, for use in any desired conference calls, the organizer may have set the URL as a bookmark and/or a home page in his or her web browser, and/or saved a browser link to the URL on the organizer's operating system desktop.

When the organizer 10 visits his or her own personal URL to initiate/join the conference call, the content of the web page may change depending on whether the organizer is signed-in to the web page (e.g., whether the conferencing service has a cookie stored on the organizer's web browser) and one or more settings selected by the organizer (step 312). For example, if web server 108 detects, e.g., from a browser cookie, that the organizer 10 is the individual requesting the organizer's personal URL, then the web page may include, for example, a welcome message to the organizer and/or indicia reflecting a default phone number typically used or selected by the organizer. In addition or alternatively, the organizer 10 may be placed into an account page or dashboard, for example, if the organizer logs-in or has previously logged-in with proper credentials within a predetermined time interval. Thus, organizer 10 might be presented with a user element, e.g., button link, to request to be called at the pre-entered phone number. Alternatively, if organizer 10 is requesting the web page of his or her personal URL from an unrecognized device or browser, then organizer 10 may be presented with a request for any phone number where the organizer can be immediately reached. For example, the web page might include a prompt to, "Enter Your Phone Number and We'll Call You."

As shown in FIG. 3, having been prompted to enter their phone number, one or more of participants 20, 30, 40 may enter their phone number at the web page of the organizer's URL (step 314). In addition, at or around the same time, organizer 10 may either enter his or her phone number, or click a link to be called at a pre-entered phone number (step 316). In one embodiment, as participants 20, 30, 40 and/or organizer 10 enter their phone numbers and/or request to be called at a pre-entered phone number, a web server 108 receiving the phone numbers and/or requests to be called at those phone numbers may transfer that data to application server(s) 110 and voice platform 114 to initiate phone calls to participants 20, 30, 40 and organizer 10. Thus, communications system 200 may initiate calls to the organizer and one or more participants at the provided phone numbers, as they request to be called (step 318).

As communications system 200 initiates calls to participants 20, 30, 40 and organizer 10, such as through voice platform 114 and SIP interface 116, and PSTN 111 and/or the Internet 101, the telephones and/or computers associated with the provided phone numbers may begin to ring or otherwise indicate an incoming call. Each of participants 20, 30, 40 and organizer 10 may then answer the phone (steps 320, 322), as shown in FIG. 3, and described above with respect to FIG. 1. As participants 20, 30, 40 and organizer 10 answer their respective phones or join through their computer VoIP connections, communications system 200 may place them into a conference call (step 322). For example, communications system 200 may use the cross-platform telecommunications application implemented on voice platform 114 and SIP interface 116 to join the voice connections with each participant into a common conference call bridge.

As shown in FIG. 3, in one embodiment, as communications system 200 places one or more of participants 20, 30, 40 and organizer 10 into the common conference call bridge, the communications system 200 may also send the participants 20, 30, 40 and organizer 10 an in-call web page (steps 324, 326). For example, in one embodiment, the web page of the organizer's personal URL may update in real time based on the interaction of participants 20, 30, 40 and organizer 10 with their telephones and with the web page. For example, when each of participants 20, 30, 40 and organizer 10 provide their respective phone numbers and ask to be called, the web page of the organizer's URL may refresh or update to indicate that communications system 200 is calling the respective user's phone. Once the participants 20, 30, 40 and organizer 10 have answered the phone, the web page of the organizer's URL may refresh or update to display a status of the conference call and one or more events associated with the conference call, as will be described in more detail below.

Figure 4:
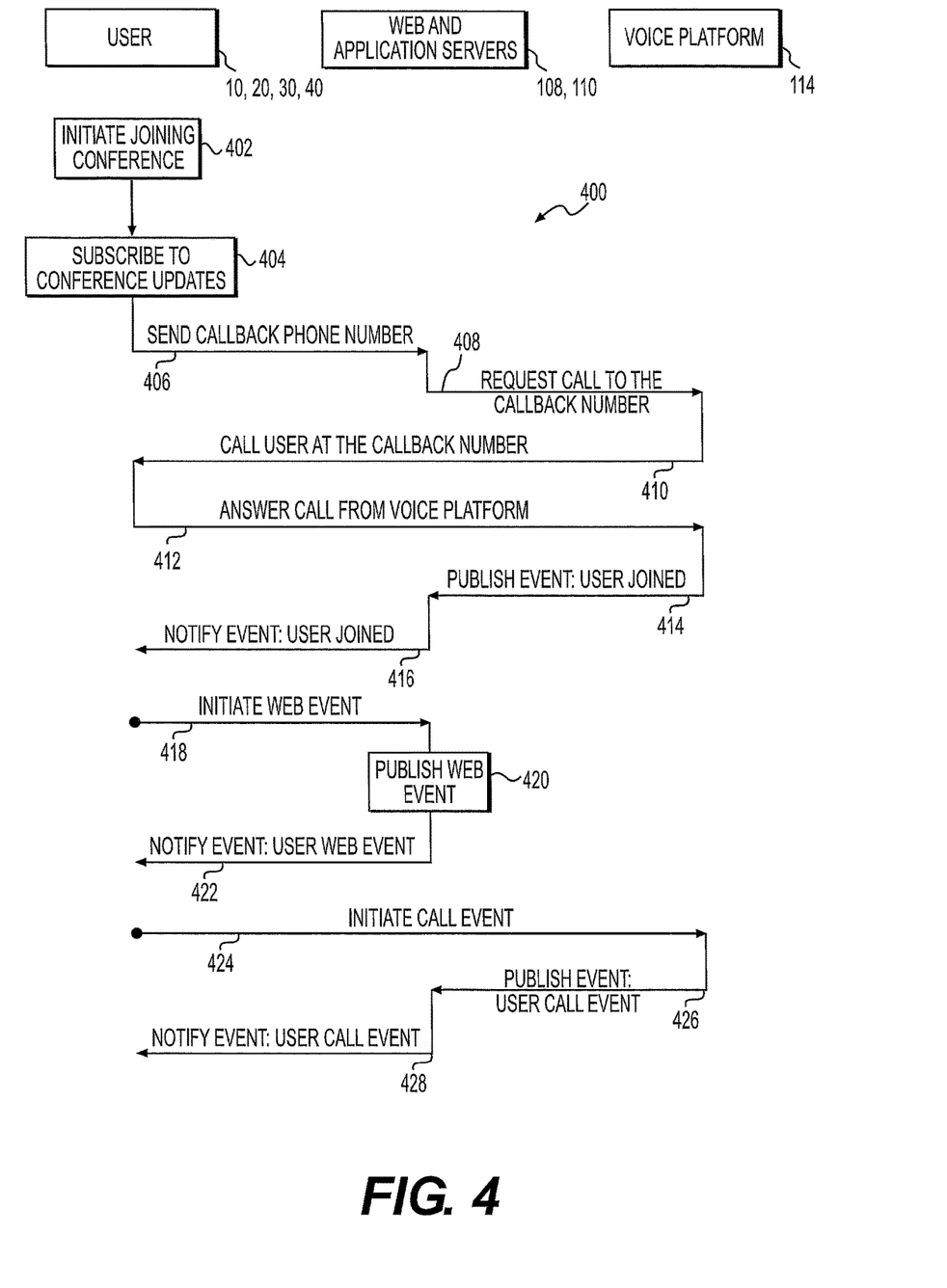
FIG. 4 is another flow diagram of another method for initiating conference calling from a personal URL, according to exemplary embodiments of the present disclosure.

FIG. 4 is another flow diagram of another method for initiating conference calling from a personal URL, according to exemplary embodiments of the present disclosure. In particular, FIG. 4 depicts a flow diagram of a method 400 by which any user (e.g., organizer 10, participants 20, 30, 40) may interact with web and application servers 108, 110 and/or voice platform 114 of communications system 200 in order to practice the exemplary method 300 of FIG. 3.

As shown in FIG. 4, a user, either an organizer or participant, may initiate joining a conference call (step 402). As discussed above, the user may initiate joining a conference call through any of a desktop or laptop computer, tablet device, mobile device, telephone, etc. Upon joining a conference call, such as by visiting a web page of an organizer's URL, the user may request to subscribe to updates associated with the conference call (step 404).

The user may then send a callback phone number to the web and application servers 108, 110 (step 406). The web and application servers 108, 110 may ask or instruct the voice platform 114 to call the user's callback number (step 408). The voice platform 114, optionally through SIP interface 116, may call the user at the provided callback number (step 410). The user may answer the call from the voice platform 114 (step 412). Upon detecting that the user answered the call, and upon placing the user into the desired conference call, the voice platform 114 may publish as an "event" that the user joined the conference call (step 414). For example, voice platform 114 may inform application server(s) 110 that the user has entered the conference, such that the application server(s) 110 may update any users associated with the conference call, such as by updating the website of the organizer's personal URL. Thus, upon publishing the event of the user's arrival to the conference room, the web and application servers 108, 110 may notify the user and any other users associated with the conference call of the event that that the user joined the conference call (step 416).

In one embodiment, at any time during a conference call, the user may initiate a web-based event (step 418). For example, the user may request to send a text note or message to other users in the conference call through a display on the web page of the organizer's URL. Alternatively or additionally, the user may request to upload and share a file (e.g., a photo, document, audio/video clip, etc.) with other users in the conference call through the web page of the organizer's URL. The user might request to initiate a private chat or instant message window with one or more of the other users in the conference call. The user might alternatively request to share a display of his or her computer screen or desktop with one or more of the other users in the conference call. Upon receiving the user's request to initiate the web event, web and application servers 108, 110 may publish the event 420. For example, in one embodiment, web and application servers 108, 110 may interact with a cloud-hosted messaging system to push real time data about the event to the other users' web, tablet and/or mobile devices. Web and application servers 108, 110 may therefore notify other users about the user's web event (step 422), by virtue of the users' subscription to events associated with the conference call during step 404. For example, web and application servers 108, 110 may cooperate to refresh or update the web page of the organizer's URL, and/or send text or mobile app updates to the users' mobile devices.

In one embodiment, at any time during a conference call, the user may initiate a call event (step 424). For example, the user may talk into his or her phone, drop off the call, mute his or her line, place his or her telephone on hold, press a number or pound or star key, or perform any other telephony-based action. Upon detecting the user's call event, voice platform 114 may publish the event by informing application server(s) 110 about the user's call event (step 426). Upon receiving notice of the user's call event, web and application servers 108, 110 may publish the event. For example, in one embodiment, web and application servers 108, 110 may interact with a cloud-hosted messaging system to push real time data about the event to the other users' web, tablet and/or mobile devices. Web and application servers 108, 110 may therefore notify other users about the user's web event (step 428). For example, web and application servers 108, 110 may cooperate to refresh or update the web page of the organizer's URL, and/or send text or mobile app updates to the users' mobile devices.

Figure 5:
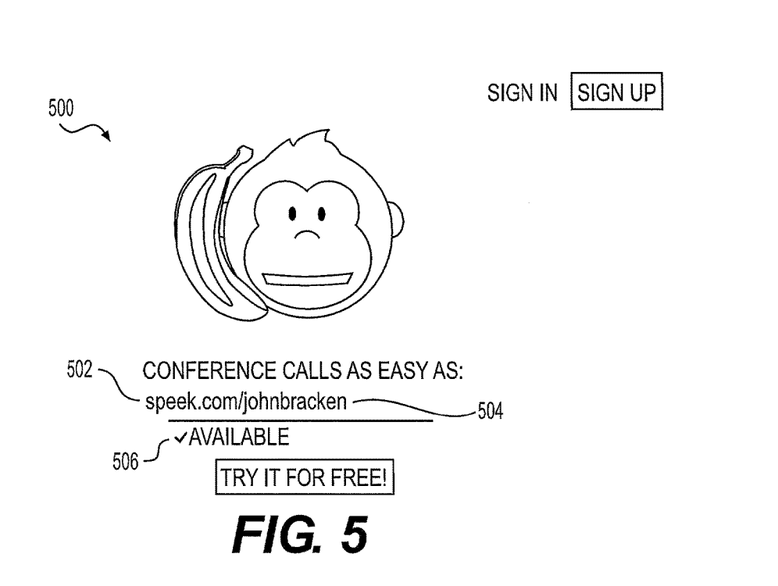
FIG. 5 is an exemplary screenshot of a web interface and system for initiating conference calling from a personal URL, according to exemplary embodiments of the present disclosure.

FIG. 5 is an exemplary screenshot of a web interface and system for initiating conference calling from a personal URL, according to exemplary embodiments of the present disclosure. Specifically, FIG. 5 shows an exemplary sign-up page 500 which may be implemented by a conference calling service to engage users to participate in the methods described above. In one embodiment, a user may be prompted to enter a name, phrase, or any other textual information for use in generating a personal, static URL for the user to use as a call originator. As shown in FIG. 5, in one embodiment, the user's personal URL may contain a domain 502 associated with the conference calling service (in this case "speek.com") and a path 504 containing the user's selected username (in this case "/johnbracken"). Thus, in one embodiment, the user's personal URL may contain the user's desired username, enabling easy memorization and typing of the user's personal URL into a mobile or web browser's address bar. Also, during the sign-up process depicted in FIG. 5, the user may see not only a preview of his or her prospective personal URL, but also indicia 506 of whether the displayed username, and therefore the displayed URL, is available or unavailable.

Figure 6:
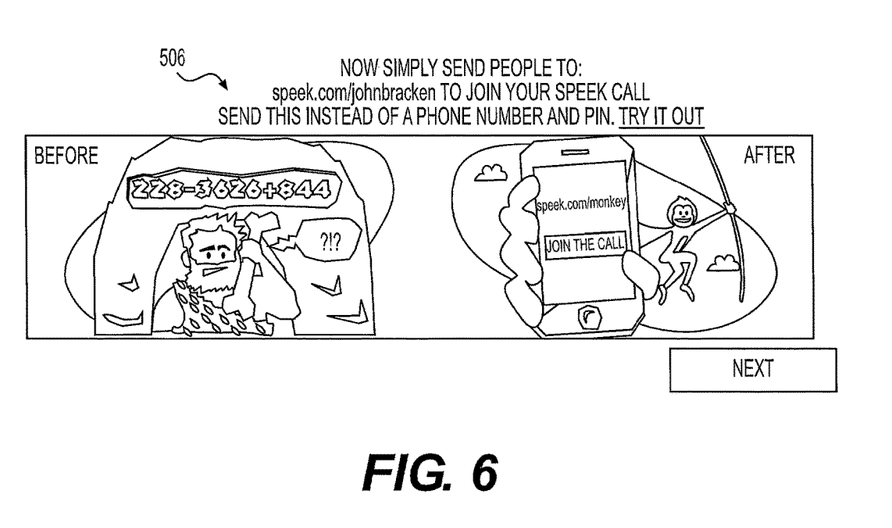
FIG. 6 is an exemplary screenshot of a web interface and system for initiating conference calling from a personal URL, according to exemplary embodiments of the present disclosure.

FIG. 6 depicts another screenshot of the web interface and system for initiating conference calling from a personal URL, according to exemplary embodiments of the present disclosure. Specifically, FIG. 6 depicts an exemplary instruction page 506, which explains a conceptual framework of the presently disclosed systems and methods. For example, instruction page 506 may display the instruction, "NOW SIMPLY SEND PEOPLE TO: speek.com/johnbracken TO JOIN YOUR SPEEK CALL. SEND THIS INSTEAD OF A PHONE NUMBER AND PIN."

Figure 7:
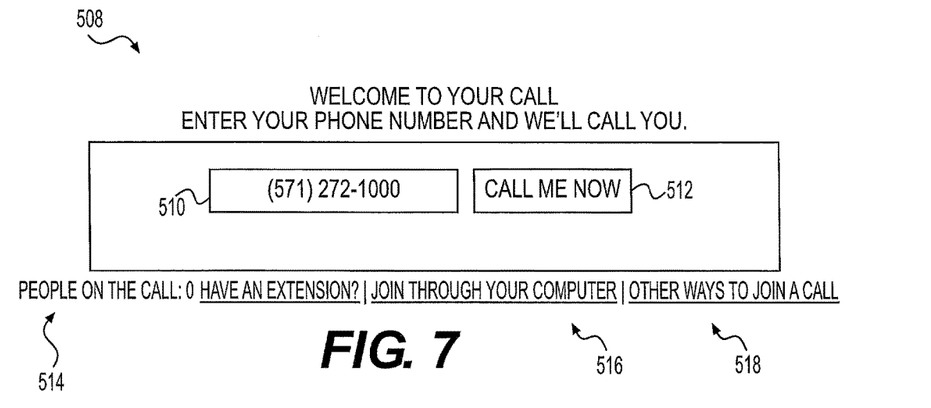
FIG. 7 is an exemplary screenshot of a web interface and system for initiating conference calling from a personal URL, according to exemplary embodiments of the present disclosure.
Figure 8:
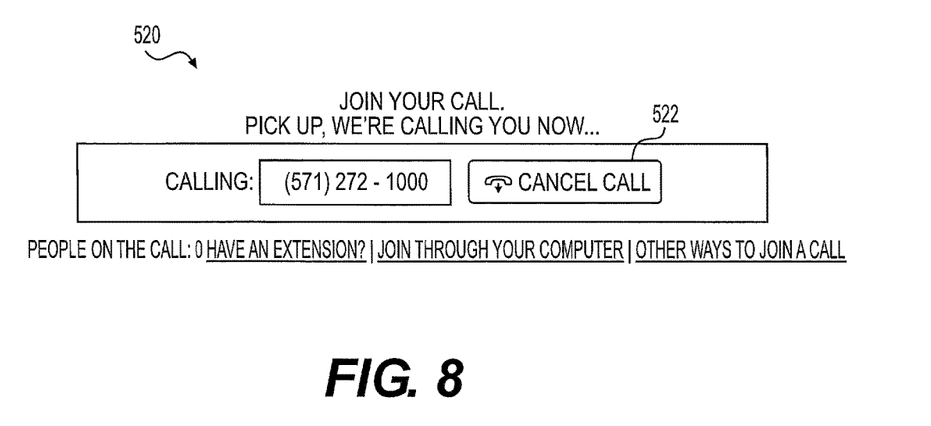
FIG. 8 is an exemplary screenshot of a web interface and system for initiating conference calling from a personal URL, according to exemplary embodiments of the present disclosure.

FIG. 7 depicts another screenshot of the web interface and system for initiating conference calling from a personal URL, according to exemplary embodiments of the present disclosure. Specifically, FIG. 7 depicts a prompt 508 by which communications system 200 may request a user's phone number when he or she visits an organizer's personal URL, consistent with step 310 of method 300 (FIG. 3) discussed above. Specifically, prompt 508 may read, "WELCOME TO YOUR CALL. ENTER YOUR PHONE NUMBER AND WE'LL CALL YOU." As shown in FIG. 7, the user viewing the prompt may have entered their phone number into a form 510, and then be able to request to be called at that entered phone number, by clicking the button link 512 reading "CALL ME NOW." In one embodiment, while viewing the web page requesting the user's phone number, the web page may also display indicia 514 of the number of people already on the conference call associated with the organizer's URL. Thus, a user may know how many people are already on the call, before even picking up the phone. In addition, the web page may display a link 516 for the user to join the call through the computer or device through which the user is viewing the web page, such as through a VoIP connection. In addition, the web page may display another link 518 that links to a page displaying other ways to join a call. In one embodiment, link 518 may load a page that describes a user's option to join the call by dialing a traditional dial-in number, or to join the call by texting a predetermined code to a phone number associated with the conferencing service. For example, in one embodiment, a user may alternatively join the organizer's call by texting (by SMS, IM, or app) the organizer's username (i.e., the path of the organizer's URL) to a phone number associated with the conferencing service. In one embodiment, once the user has entered their phone number and clicked the "CALL ME NOW" button, the web page may immediately update or refresh to replace prompt 508 with a notice 520 that the communications system 200 is calling the user. For example, in one embodiment, the notice 520 may read, "JOIN YOUR CALL. PICK UP, WE'RE CALLING YOU NOW." In addition, the web page may replace the "CALL ME NOW" button with a link 522 to cancel the call.

Figure 9:
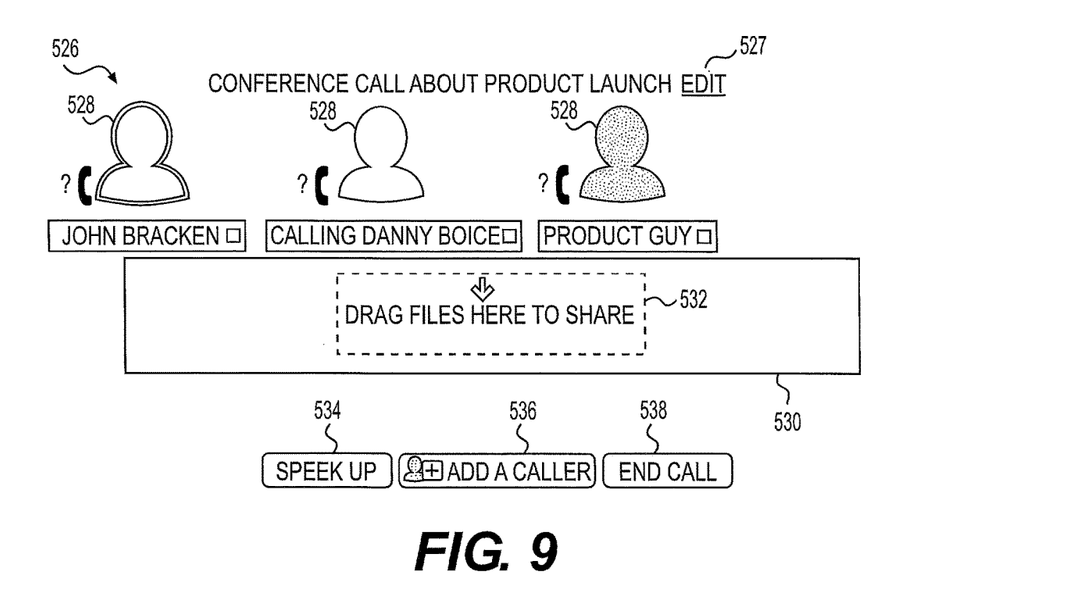
FIG. 9 is an exemplary screenshot of a web interface and system for initiating conference calling from a personal URL, according to exemplary embodiments of the present disclosure.

Once the user has answered the call from the communications system 200, the web page visible to the user (still associated with the organizer's URL) may update to display an in-call page 526, as shown in FIG. 9. As shown in FIG. 9, in one embodiment, a user may manipulate user element 527 to change a title viewed by the call participants in relation to the conference call. In one embodiment, as shown in FIG. 9, the in-call page 526 may depict a plurality of avatars 528, each avatar 528 being associated with one of the users joined into the conference call. In one embodiment, avatars 528 may be animations or photos of the users, which may have been uploaded by the respective users. Alternatively, avatars 528 may be replaced with live video feeds of the joined call participants, using one or more cameras of the respective participants' computers or mobile devices. As shown in FIG. 9, in one embodiment, avatars 528 may be depicted as being gathered around an object 530, which may be a photo or illustration of any object, such a conference table, a water cooler, a white board, a campfire, or any other image selected by or uploaded by the organizer or one of the participants.

In one embodiment, the in-call page 526 may include a user element 532 by which one or more of the users may initiate sharing of one or more files. User element 532 may or may not be associated with the object 530. In one embodiment, users may drag files (e.g., photos, documents, presentations, video/audio clips, etc.) from their local computers or mobile devices onto the user element 532 to automatically upload and share those files with the other call participants.

Figure 10:
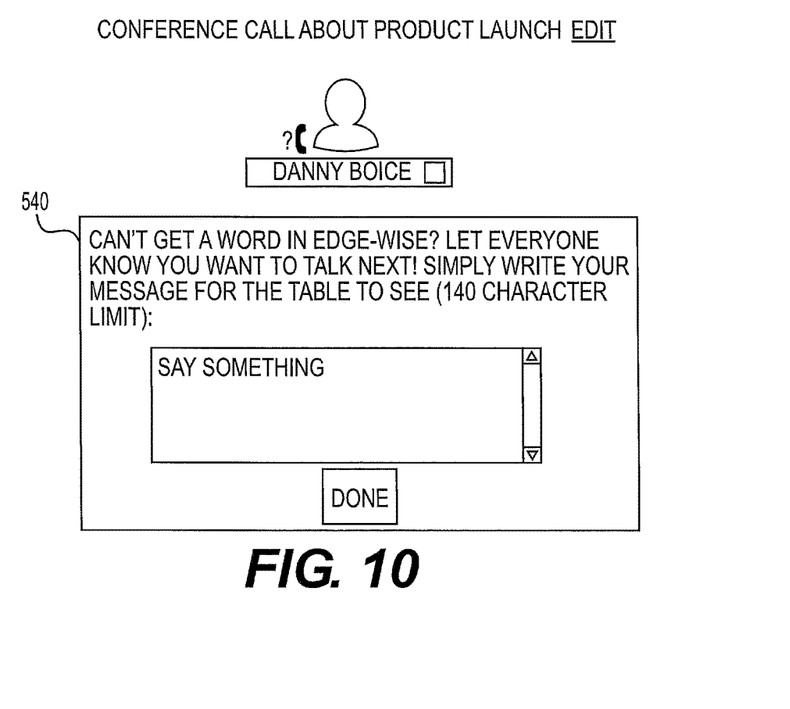
FIG. 10 is an exemplary screenshot of a web interface and system for initiating conference calling from a personal URL, according to exemplary embodiments of the present disclosure.
Figure 11:
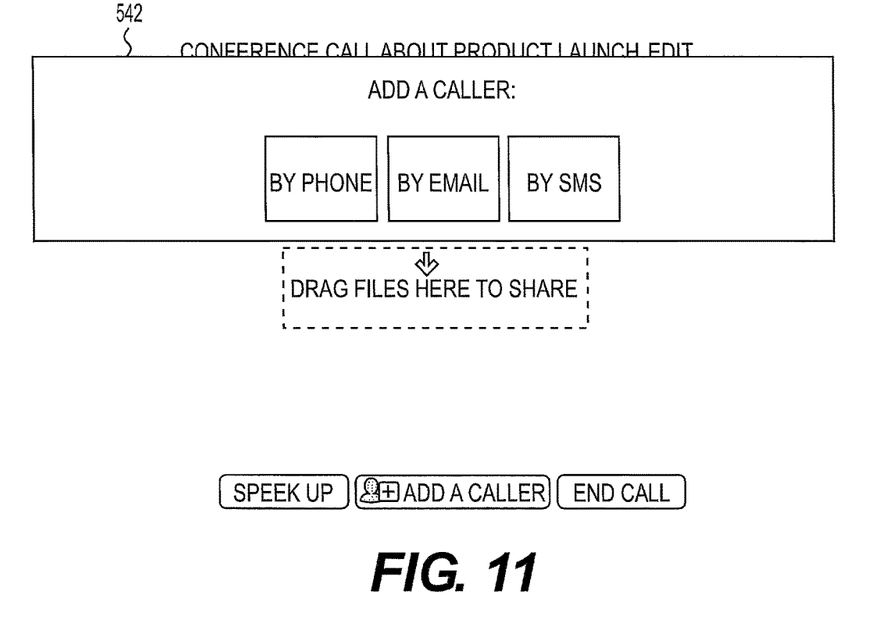
FIG. 11 is an exemplary screenshot of a web interface and system for initiating conference calling from a personal URL, according to exemplary embodiments of the present disclosure.

In one embodiment, the in-call page 526 may include a user element 534 by which a user may initiate textual communication with one or more other users in the conference call; a user element 536 by which any users in the conference call may request to add another user to the conference call; and a user element 538 to end the call. FIG. 10 depicts an exemplary text interface 540 that may pop-up or otherwise appear upon a user's selection of user element 534. Text interface 540 may enable the user to communicate by text with all of the participants in the conference call, or to individually select a subset of one or more participants with whom to communicate by text. FIG. 11 depicts a user interface 542 that may pop-up or otherwise appear upon a user's selection of user element 536. As shown in FIG. 11, in one embodiment, any user in the conference call may select user element 536 and then interact with user interface 542 to request to join another user into the conference call, such as by phone, e-mail, or SMS. For example, user interface 542 may request the user to enter the contact information (e.g., phone number, e-mail address, social networking alias, etc.) for the method the user requests the communications system 200 to use to contact and join the prospective new participant.

Figure 12:
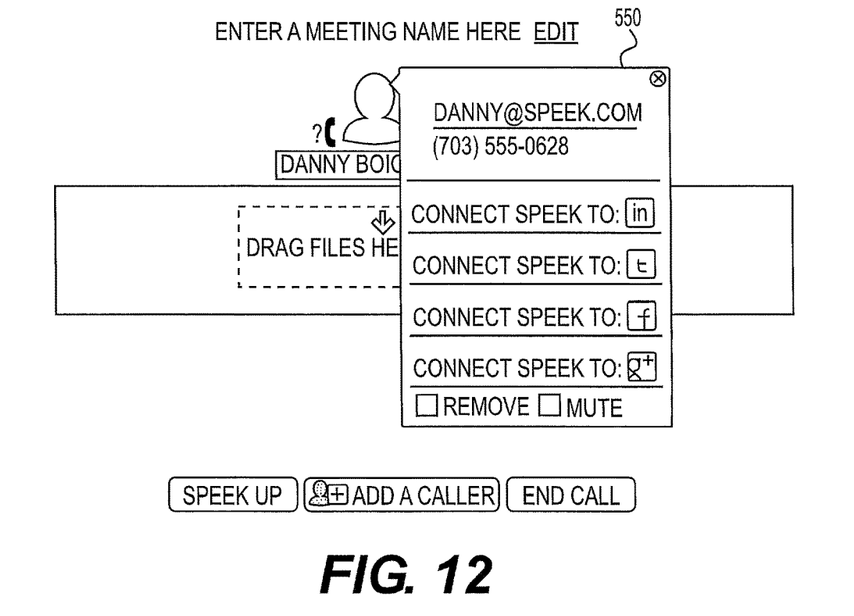
FIG. 12 is an exemplary screenshot of a web interface and system for initiating conference calling from a personal URL, according to exemplary embodiments of the present disclosure.

FIG. 12 depicts another screenshot of a connection interface 550 that a user may open to update their displayed name and/or their linked e-mail address(es), phone number(s), and social or professional network profiles. For example, a user may click one or more links in connection interface 550 to update displayed contact information or social network information. The user may alternatively or additionally fill-in one or more forms in connection interface 500 to edit or provide additional contact or social networking information.

The foregoing screenshots of FIGS. 5-12 are only exemplary in nature and for purposes of illustrating possible user interfaces consistent with the systems and methods described with respect to FIGS. 1-4. It should be appreciated that any other style of a web interface may be used to carry out the methods of FIGS. 1-4. Moreover, any of the depicted screenshots may be implemented in any of a desktop client, web browser, mobile browser, and/or mobile application, depending on available user devices and user preferences.

By eliminating the use of the traditional dial-in number, conference room number, and moderator number, the presently disclosed systems and methods allow users to more quickly and easily join calls without having to look up these numbers to join the call. Additionally, the presently disclosed systems and methods allow participants to join either via a phone call made directly to the participant from the conference system (if the user is on a landline or mobile phone using voice technology) or via a voice over Internet Protocol ("VoIP") session on the participant's computer or mobile device.

Although the presently-disclosed systems and methods are described with respect to audio conferencing, it should be appreciated that they may be equally as applicable to commence an audiovisual conference as well. In addition, there is no limit to the number of participants that can quickly and easily join a conference call.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A computer-implemented method for managing conference calling, the method comprising:
receiving, over an electronic network, a unique identifier to be included in a static URL of a web page;
generating, by at least one processor, the web page associated with the static URL that includes the unique identifier;
receiving, over the electronic network, from a prospective conference call participant, a request for the web page of the static URL;
transmitting, over the electronic network, the web page of the static URL to each prospective conference call participant;
receiving from each prospective conference call participant, a request to be placed into a conference call associated with the static URL;
responsive to receipt of each request to be placed into the conference call, providing a conference call bridging service with information indicating that the prospective conference call participant has requested to join the conference call associated with the static URL; and
responsive to receipt of information from the conference call bridging service confirming that the prospective conference call participant has been joined to the conference call associated with the static URL and, as a consequence, is a current participant in the conference call, updating the web page of the static URL to display an identifier of the current participant, the web page being the web page of the static URL transmitted to each prospective conference call participant;
wherein the identifier of the current participant is one of: an avatar, and an animation associated with the current participant, and the web page is updated to depict each of the current participants, as depicted by their respective identifiers, in association with a physical object;
wherein the static URL includes a first part that is a domain of a service provider, and a second part appended to the first part and that is the unique identifier identifying an organizer of the conference call.

2. The method of claim 1, further including associating a live video feed of the current participant with the conference call.

3. The method of claim 1, wherein a static URL associated with a different conference call that includes other conference call participants includes the first part that is the domain of the service provider, and a third part that is a unique identifier different from the second part.

4. The method of claim 1, wherein the request to be placed into the conference call includes a phone number at which the prospective conference call participant can be called by the conference call bridging service.

5. The method of claim 4, wherein the prospective conference call participant is joined to the conference call at the phone number.

6. The method of claim 1, wherein the information is provided to the conference call bridging service over an application programming interface (API) that is associated with a web service at which the web page is published.

7. The method of claim 1, wherein the request to be placed into the conference call is received from a mobile device associated with the prospective conference call participant.

8. The method of claim 1, further comprising:
receiving, over the electronic network at the web page of the static URL, a request to publish at least one of text and a file to the web page of the static URL; and
updating the web page of the static URL based on the request to publish at least one of text and the file.

9. The method of claim 1, wherein the request to be placed into the conference call includes a voice over IP connection at which the prospective conference call participant can be called.

10. A system for managing conference calling, the system comprising:
a data storage device storing instructions for managing conference calling; and
a processor configured to execute the instructions to:
receive, over an electronic network, a unique identifier to be included in a static URL of a web page;
generate the web page associated with the static URL that includes the unique identifier;
receive, over the electronic network, from a prospective conference call participant, a request for the web page of the static URL;
transmit, over the electronic network, the web page of the static URL to each prospective conference call participant;
receive from each prospective conference call participant, a request to be placed into a conference call associated with the static URL;
responsive to receipt of each request to be placed into the conference call, provide a conference call bridging service with information indicating that the prospective conference call participant has requested to join the conference call associated with the static URL; and
responsive to receipt of information from the conference call bridging service confirming that the prospective conference call participant has been joined to the conference call associated with the static URL and, as a consequence, is a current participant in the conference call, update the web page of the static URL to display an identifier of the current participant, the web page being the web page of the static URL transmitted to each prospective conference call participant;
wherein the identifier of the current participant is one of: an avatar, and an animation associated with the current participant, and the web page is updated to depict each of the current participants, as depicted by their respective identifiers, in association with a physical object.

11. The system of claim 10, wherein the processor is further configured to execute the instructions to:
associate a live video feed of the current participant with the conference call.

12. The system of claim 10, wherein the processor is further configured to execute the instructions to:
receive, over the electronic network at the web page of the static URL, a request to publish at least one of text and a file to the web page of the static URL; and
update the web page of the static URL based on the request to publish at least one of text and the file.

13. The system of claim 10, wherein the conference call with the prospective conference call participant is initiated at least in part using a SIP trunking connection to a public switched telephone network.

14. The system of claim 10, wherein the request to be placed into the conference call includes a phone number at which the prospective conference call participant can be called by the conference call bridging service.

15. The system of claim 14, wherein the conference call with the prospective conference call participant is joined to the conference call at the phone number.

16. The system of claim 10, wherein the static URL includes a first part that is a domain of a service provider, and a second part appended to the first part and that is the unique identifier identifying an organizer of the conference call.

17. The system of claim 16, wherein a static URL associated with a different conference call that includes other conference call participants includes the first part that is the domain of the service provider, and a third part that is a unique identifier different from the second part.

18. The system of claim 10, wherein the static URL is created at least in part based on a selection by the prospective conference call participant.

* * * * *